(12) United States Patent
Toya

(10) Patent No.: US 10,387,688 B2
(45) Date of Patent: Aug. 20, 2019

(54) METHOD FOR CONTROLLING SERVER DEVICE, AND SERVER DEVICE

(71) Applicant: Panasonic Intellectual Property Management Co., Ltd., Osaka (JP)

(72) Inventor: Shoichi Toya, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 61 days.

(21) Appl. No.: 15/376,694

(22) Filed: Dec. 13, 2016

(65) Prior Publication Data

US 2017/0193250 A1 Jul. 6, 2017

(30) Foreign Application Priority Data

Jan. 6, 2016 (JP) .................. 2016-001354

(51) Int. Cl.
*G06F 21/81* (2013.01)
*G06F 21/44* (2013.01)
(Continued)

(52) U.S. Cl.
CPC .............. *G06F 21/81* (2013.01); *G06F 21/44* (2013.01); *G06F 21/88* (2013.01);
(Continued)

(58) Field of Classification Search
CPC .......... G06F 21/81; G06F 21/88; G06F 21/44; H01M 2/1077; H01M 2010/4278; H01M 10/425; H01M 2220/20
See application file for complete search history.

(56) References Cited

U.S. PATENT DOCUMENTS

| 8,370,959 B2* | 2/2013 | Gunadisastra ......... G06F 21/34 713/320 |
| 2007/0145945 A1* | 6/2007 | McGinley ................ H02J 7/00 320/114 |

(Continued)

FOREIGN PATENT DOCUMENTS

| CN | 102110994 A | 6/2011 |
| CN | 103392283 A | 11/2013 |
| JP | 2004-222457 | 8/2004 |

OTHER PUBLICATIONS

English Translation of Chinese Search Report dated Dec. 3, 2018 for Chinese Patent Application No. 201610882210.7.

*Primary Examiner* — Chau Le
(74) *Attorney, Agent, or Firm* — Greenblum & Bernstein, P.L.C.

(57) ABSTRACT

A method including: receiving identification information of a charging device including individual identification information of the charging device, and identification information of a power storage device, which is connected to the charging device, including individual identification information of the power storage device, from at least one of the charging device and the power storage device; determining the possibility of charging the power storage device from the identification information of the power storage device and the identification information of the charging device received; and transmitting information indicating the determined possibility of charging the power storage device to at least one of the charging device and the power storage device.

13 Claims, 11 Drawing Sheets

(51) Int. Cl.
  *G06F 21/88* (2013.01)
  *H01M 2/10* (2006.01)
  *H01M 2/34* (2006.01)
  *H01M 10/42* (2006.01)

(52) U.S. Cl.
  CPC ......... H01M 2/1077 (2013.01); H01M 2/341 (2013.01); H01M 10/425 (2013.01); *H01M 2010/4278* (2013.01); *H01M 2220/20* (2013.01)

(56) References Cited

U.S. PATENT DOCUMENTS

| | | | | |
|---|---|---|---|---|
| 2009/0256717 A1* | 10/2009 | Iwai | ............................ | G06F 1/26 340/5.8 |
| 2009/0278492 A1* | 11/2009 | Shimizu | ............... | B60L 11/1816 320/108 |
| 2010/0001687 A1* | 1/2010 | Watanabe | ................. | B60L 3/12 320/109 |
| 2012/0146429 A1* | 6/2012 | Seol | ........................ | B62M 6/45 307/116 |
| 2012/0187900 A1* | 7/2012 | Murawaka | ........... | B60L 11/1824 320/106 |
| 2012/0293117 A1* | 11/2012 | Suzuki | ................... | H02J 7/0006 320/108 |
| 2013/0009597 A1* | 1/2013 | Boot | ......................... | B60L 3/12 320/109 |
| 2013/0198551 A1* | 8/2013 | Marlin | ....................... | G06F 1/26 713/340 |
| 2014/0059350 A1* | 2/2014 | Unagami | ............. | B60L 11/1846 713/169 |
| 2014/0247121 A1* | 9/2014 | Satake | .................... | B60R 25/40 340/426.11 |
| 2015/0306967 A1* | 10/2015 | Cohen | ................. | B60L 11/1846 701/32.3 |
| 2015/0372518 A1* | 12/2015 | Toya | ..................... | G06F 3/0488 320/106 |
| 2017/0344358 A1* | 11/2017 | Kano | .................... | H01M 10/46 |

* cited by examiner

METHOD FOR CONTROLLING SERVER DEVICE, AND SERVER DEVICE

BACKGROUND

1. Technical Field

The present disclosure relates to a method for controlling a server device and the like.

2. Description of the Related Art

To date, various charging systems for charging power storage devices have been proposed. The charging system described in Japanese Unexamined Patent Application Publication No. 2004-222457 is an example thereof.

SUMMARY

However, power storage devices are not always used appropriately, and inappropriate use is possible.

One non-limiting and exemplary embodiment provides a method for controlling a server device and the like for supporting the appropriate use of a power storage device.

In one general aspect, the techniques disclosed here feature a method that includes: (a) receiving identification information of a charging device including individual identification information of the charging device, and identification information of a power storage device, which is connected to the charging device, including individual identification information of the power storage device, from at least one of the charging device and the power storage device; (b) determining the possibility of charging the power storage device from the identification information of the power storage device and the identification information of the charging device received in the step (a); and (c) transmitting information indicating the determined possibility of charging the power storage device to at least one of the charging device and the power storage device.

It should be noted that this comprehensive or specific aspect may be realized by a system, a device, a method, an integrated circuit, a computer program, or a non-transitory recording medium such as a computer-readable CD-ROM, and may be realized by an arbitrary combination of a system, a device, a method, an integrated circuit, a computer program, and a recording medium.

The appropriate use of a power storage device is supported by means of a method for controlling a server device and the like according to an aspect of the present disclosure.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
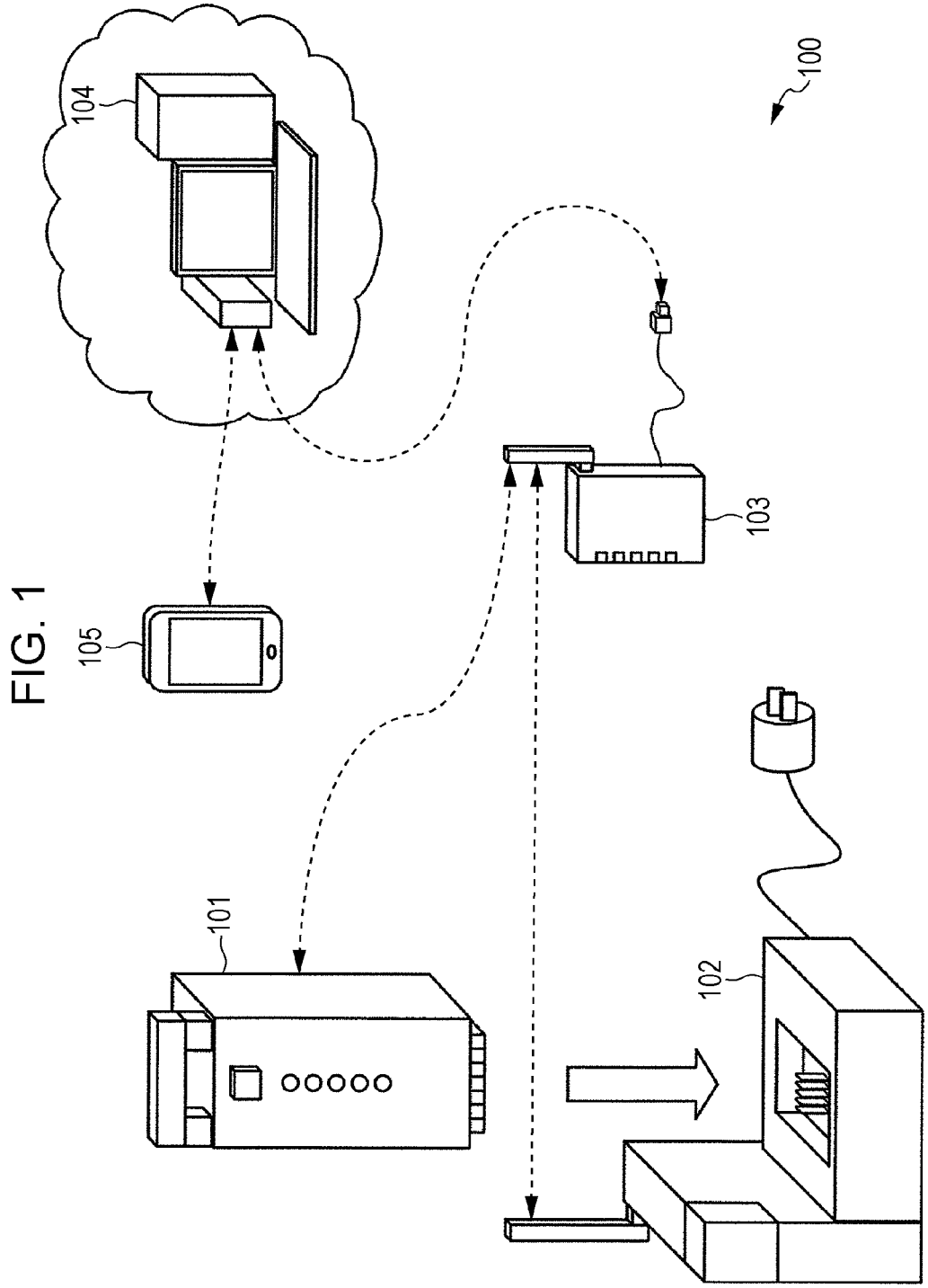
FIG. 1 is a conceptual diagram depicting a charging system in an embodiment.

DETAILED DESCRIPTION (Findings Forming the Basis for the Present Disclosure)

The present inventor carried out an investigation and discovered a problem in relation to the use of power storage devices. This is described in detail hereinafter.

Electrical devices that operate by means of a power storage device have become widespread in recent years. An electrically assisted bicycle is an example thereof. The user of an electrical device purchases a power storage device for operating the electrical device, and operates the electrical device by means of the purchased power storage device, for example. Recently, investigations have also started to be carried out into rental systems for power storage devices which make it possible for the user of an electrical device to borrow a power storage device for operating the electrical device, and to operate the electrical device by means of the borrowed power storage device.

For example, in this kind of rental system, information regarding the charging of a power storage device that has been rented to a borrower may be collected, and the collected information may be reflected in the billing for the borrower. That is, in the rental system, a usage fee for the power storage device may be calculated according to the charging of the power storage device. Thus, in the rental system, the borrower of a power storage device can be appropriately billed according to the use of the power storage device.

However, there is a possibility that a power storage device rented to a borrower may be stolen from the borrower. There is therefore a possibility that an unauthorized person who has stolen the power storage device may charge and use that power storage device. Thus, there is a possibility that charging information may be collected and the borrower may be billed inappropriately. Furthermore, there is a possibility that the power storage device may be inappropriately used by the unauthorized person who has stolen the power storage device.

Furthermore, the present disclosure is not restricted to power storage devices in a rental system such as the above-mentioned, and it is desirable for power storage devices to be appropriately controlled to ensure they are appropriately used.

Thus, a method according to a first aspect of the present disclosure includes: (a) receiving identification information of a charging device including individual identification information of the charging device, and identification information of a power storage device, which is connected to the charging device, including individual identification information of the power storage device, from at least one of the charging device and the power storage device; (b) determining the possibility of charging the power storage device from the identification information of the power storage device and the identification information of the charging device received in the step (a); and (c) transmitting information indicating the determined possibility of charging the power storage device to at least one of the charging device and the power storage device.

Thus, both the identification information of the power storage device and the identification information of the charging device are used to determine the possibility of charging. Compared to the power storage device, the possibility of the charging device being taken outside and used is low, and the possibility of the charging device being used by an unauthorized person other than the owner of the charging device is low. Consequently, due to both the identification information of the power storage device and the identification information of the charging device being used, it is possible to suppress the power storage device being used by an unauthorized person. Thus, the appropriate use of the power storage device is supported.

Furthermore, a method according to a second aspect of the present disclosure, in the method for controlling the server device of the abovementioned first aspect, for example, may include: (d) associating to each other and storing, in a storage device of the server device, the identification information of the power storage device and the identification information of the charging device, in which, in the step (b), when the association between the identification information of the power storage device and the identification information of the charging device received corresponds with the association between the identification information of the power storage device and the identification information of the charging device stored by the storage device, charging the power storage device may be determined as being possible, and when the association between the identification information of the power storage device and the identification information of the charging device received does not correspond with the association between the identification information of the power storage device and the identification information of the charging device stored by the storage device, charging the power storage device may be determined as not being possible.

Thus, the possibility of charging the power storage device is appropriately determined on the basis of the information stored in the storage device.

Furthermore, a method according to a third aspect of the present disclosure, in the method for controlling the server device of the first aspect, for example, may include: (d) associating to each other and storing, in a storage device of the server device, the identification information of the power storage device and the identification information of the charging device, in which, in the step (b), when the association between the identification information of the power storage device and the identification information of the charging device received corresponds with the association between the identification information of the power storage device and the identification information of the charging device stored by the storage device, charging the power storage device may be determined as being possible, and when the association between the identification information of the power storage device and the identification information of the charging device received does not correspond with the association between the identification information of the power storage device and the identification information of the charging device stored by the storage device, a query regarding the possibility of charging the power storage device may be transmitted to an external communication terminal, and, after the query has been transmitted to the external communication terminal, when response information indicating that charging the power storage device is not possible is received from the external communication terminal, charging the power storage device may be determined as not being possible, and when response information indicating that charging the power storage device is possible is received from the external communication terminal, charging the power storage device may be determined as being possible.

Thus, the possibility of charging the power storage device is appropriately determined on the basis of the information stored in the storage device or the response to the query. Furthermore, the external communication terminal to which the query is transmitted is, for example, at least one of a communication terminal of the legitimate owner of the power storage device and a communication terminal of the legitimate owner of the charging device. Thus, it is possible to issue a query regarding the possibility of charging to at least one of the legitimate owner of the power storage device and the legitimate owner of the charging device.

Furthermore, a method according to a fourth aspect of the present disclosure, in the method for controlling the server device of the third aspect, for example, may include: (e) when the response information indicating that charging the power storage device is possible is received from the external communication terminal, associating to each other and storing, in the storage device, the identification information of the power storage device and the identification information of the charging device received.

Thus, the identification information of the power storage device and the identification information of the charging device are appropriately associated and stored in the storage device on the basis of the response to the query.

Furthermore, a method according to a fifth aspect of the present disclosure, in the method for controlling the server device of any of the first to fourth aspects, for example, may include: (f) receiving information indicating that the power storage device has been stolen, and the identification information of the stolen power storage device; and (g) when the identification information of the power storage device received in the step (a) is the identification information of the stolen power storage device, regardless of the correspondence between the identification information of the power storage device and the identification information of the charging device received in the step (a), determining that charging the power storage device is not possible, and transmitting information indicating that charging the power storage device is not possible to at least one of the charging device and the power storage device.

Thus, it is possible to suppress use of the stolen power storage device. Consequently, the inappropriate use of the power storage device is suppressed, and the appropriate use of the power storage device is supported.

Furthermore, with regard to a method according to a sixth aspect of the present disclosure, in the method for controlling the server device of any of the first to fifth aspects, for example, the identification information of the power storage device, in addition, may include at least one of manufacturing information of the power storage device and design information of the power storage device.

The credibility of the identification information of the power storage device is thereby increased. Furthermore, the possibility of charging the power storage device is appropriately determined in accordance with the manufacturing information or the design information of the power storage device. Consequently, inappropriate use of the power storage device is suppressed.

Furthermore, with regard to a method according to a seventh aspect of the present disclosure, in the method for controlling the server device of any of the first to sixth aspects, for example, the identification information of the charging device, in addition, may include at least one of manufacturing information of the charging device and design information of the charging device.

The credibility of the identification information of the charging device is thereby increased. Furthermore, the possibility of charging the power storage device is appropriately determined in accordance with the manufacturing information or the design information of the charging device. Consequently, inappropriate use of the power storage device is suppressed.

Furthermore, with regard to method according to an eighth aspect of the present disclosure, in the method for controlling the server device of any of the first to seventh aspects, for example, in the step (a), a security key of the power storage device and a security key of the charging device may be received together with the identification information of the charging device and the identification information of the power storage device, (h) determining a possibility of reading the identification information of the power storage device and the identification information of the charging device, based on the security key of the power storage device and the security key of the charging device received, may be included, and, in the step (b), when reading the identification information of the power storage device and the identification information of the charging device is determined as being possible in the step (h), the identification information of the power storage device and the identification information of the charging device may be read, and the possibility of charging the power storage device may be determined from the identification information of the power storage device and the identification information of the charging device that have been read.

The credibility of the identification information of the power storage device and the identification information of the charging device is thereby increased. Consequently, inappropriate use of the power storage device is suppressed.

Furthermore, a server device according to a ninth aspect of the present disclosure includes: a receiver that receives identification information of a charging device including individual identification information of the charging device, and identification information of a power storage device, which is connected to the charging device, including individual identification information of the power storage device, from at least one of the charging device and the power storage device; a determiner that determines the possibility of charging the power storage device from the identification information of the power storage device and the identification information of the charging device received by the receiver; and a transmitter that transmits information indicating the possibility of charging the power storage device determined by the determiner, to at least one of the charging device and the power storage device.

Thus, the server device is able to use both the identification information of the power storage device and the identification information of the charging device to determine the possibility of charging. Compared to the power storage device, the possibility of the charging device being taken outside and used is low, and the possibility of the charging device being used by an unauthorized person other than the owner of the charging device is low. Consequently, due to both the identification information of the power storage device and the identification information of the charging device being used, it is possible to suppress the power storage device being used by an unauthorized person. Thus, the server device is able to support the appropriate use of the power storage device.

It should be noted that these comprehensive or specific aspects may be realized by a system, a device, a method, an integrated circuit, a computer program, or a non-transitory recording medium such as a computer-readable CD-ROM, and may be realized by an arbitrary combination of a system, a device, a method, an integrated circuit, a computer program, and a recording medium.

Hereinafter, embodiments will be described in a specific manner with reference to the drawings. It should be noted that the embodiments described hereinafter all represent comprehensive or specific examples. The numerical values, the shapes, the materials, the constituent elements, the arrangement positions and modes of connection of the constituent elements, the steps, and the order of the steps and the like given in the following embodiments are examples and are not intended to limit the present disclosure. Furthermore, from among the constituent elements in the following embodiments, constituent elements that are not described in the independent claims indicating the most significant concepts are described as optional constituent elements.

Embodiments

FIG. 1 is a conceptual diagram depicting a charging system in an embodiment. The charging system 100 depicted in FIG. 1 is provided with a power storage device 101, a charging device 102, a router 103, a server device 104, and a communication terminal 105.

The power storage device 101 is a power storage device in which charging and discharging is carried out. The power storage device 101 is also referred to as a storage battery pack. Specifically, the power storage device 101 includes storage batteries. Furthermore, for example, the power storage device 101 is rented out from a rental company, and is connected to an electrical device such as an electrically assisted bicycle. The electrical device to which the power storage device 101 is connected operates due to the power storage device 101 discharging. Furthermore, the power storage device 101 is connected to the charging device 102 and is charged.

The connection between the power storage device 101 and the charging device 102 for charging is not restricted to a physical connection and may be an electrical connection. For example, the power storage device 101 and the charging device 102 may be electrically connected rather than physically connected in order to carry out non-contact charging.

Furthermore, it is possible for the power storage device 101 to communicate with the charging device 102 to which the power storage device 101 is connected. Furthermore, the power storage device 101 may be able to communicate with the server device 104 via the router 103 or the like. Furthermore, the power storage device 101 may be able to communicate with the server device 104 in a direct manner rather than via the router 103 or the like. Wired communication may be applied or wireless communication may be applied for these communications.

For example, since the power storage device 101 and the charging device 102 are connected, a wired communication may be applied for the communication between the power storage device 101 and the charging device 102. Alternatively, the IEEE 802.15.1 specification, which is an international standard specification for short-range wireless communication represented by Bluetooth (registered trademark), may be applied for the communication between the power storage device 101 and the charging device 102.

Furthermore, the IEEE 802.11 specification, which is an international standard specification for wireless communication represented by the wireless local area network (LAN) or Wi-Fi (registered trademark), may be applied for the communication between the power storage device 101 and the router 103.

The charging device 102 is a charger for charging the power storage device 101. The charging device 102 may be a charger that is rented out from a rental company. For example, the charging device 102 converts alternating-current power supplied from a power system into direct-current power having a predetermined voltage, supplies the direct-current power having the predetermined voltage to the power storage device 101, and thereby charges the power storage device 101.

Furthermore, the charging device 102 is able to communicate with the power storage device 101 connected to the charging device 102. Furthermore, the charging device 102 may be able to communicate with the server device 104 via the router 103 or the like. Furthermore, the charging device 102 may be able to communicate with the server device 104 in a direct manner rather than via the router 103 or the like. Wired communication may be applied or wireless communication may be applied for these communications.

For example, the IEEE 802.3 specification, which is an international specification for wired communication represented by wired LAN, may be applied for the communication between the charging device 102 and the router 103. Furthermore, the IEEE 802.11 specification, which is the international standard specification for wireless communication represented by wireless LAN or Wi-Fi (registered trademark), may be applied for the communication between the charging device 102 and the router 103.

The router 103 is a device for relaying communication. Specifically, the router 103 is able to communicate with the power storage device 101 or the charging device 102. Furthermore, the router 103 is able to communicate with the server device 104 via a communication network such as the Internet. Communication between the power storage device 101 and the server device 104 or communication between the charging device 102 and the server device 104 is then relayed. Wired communication may be applied or wireless communication may be applied for these communications.

For example, the router 103 may communicate with the power storage device 101 or the charging device 102 in a wireless manner, and communicate with the server device 104 in a wired manner. The IEEE802.3 specification, which is an international specification for wired communication represented by wired LAN, may be applied for part of the communication between the router 103 and the server device 104. Furthermore, the router 103 may be able to communicate with one of the power storage device 101 and the charging device 102, or may be able to communicate with both.

The server device 104 is an example of a server device of the present disclosure, and is a server device for supporting the appropriate use of the power storage device 101. The server device 104 may be an information processing device such as a computer. Furthermore, the server device 104 may be made up of a plurality of devices.

Furthermore, the server device 104 is able to communicate with the router 103 via a communication network such as the Internet. The server device 104 is then able to communicate with the power storage device 101 or the charging device 102 via the router 103 or the like. Alternatively, the server device 104 may be able to communicate with the power storage device 101 or the charging device 102 in a direct manner rather than via the router 103 or the like.

Furthermore, the server device 104 may be able to communicate with one of the power storage device 101 and the charging device 102, or may be able to communicate with both. Furthermore, the server device 104 may be able to communicate with the communication terminal 105. Wired communication may be applied or wireless communication may be applied for these communications.

For example, a communication specification used by a mobile communication system such as the third-generation mobile communication system (3G), the fourth-generation mobile communication system (4G), or LTE (registered trademark) may be applied for the communication between the server device 104 and the communication terminal 105. More specifically, International Mobile Telecommunications (IMT)-2000, IMT-Advanced, or the like may be applied.

The communication terminal 105 is a device that is able to communicate with the server device 104 or the like. The communication terminal 105 may be an information processing device such as a computer. More specifically, the communication terminal 105 may be a mobile terminal, may be a mobile telephone, or may be a smartphone. Furthermore, the communication terminal 105 may be a communication terminal of the legitimate owner of the power storage device 101, or may be a communication terminal of the legitimate owner of the charging device 102.

Figure 2:
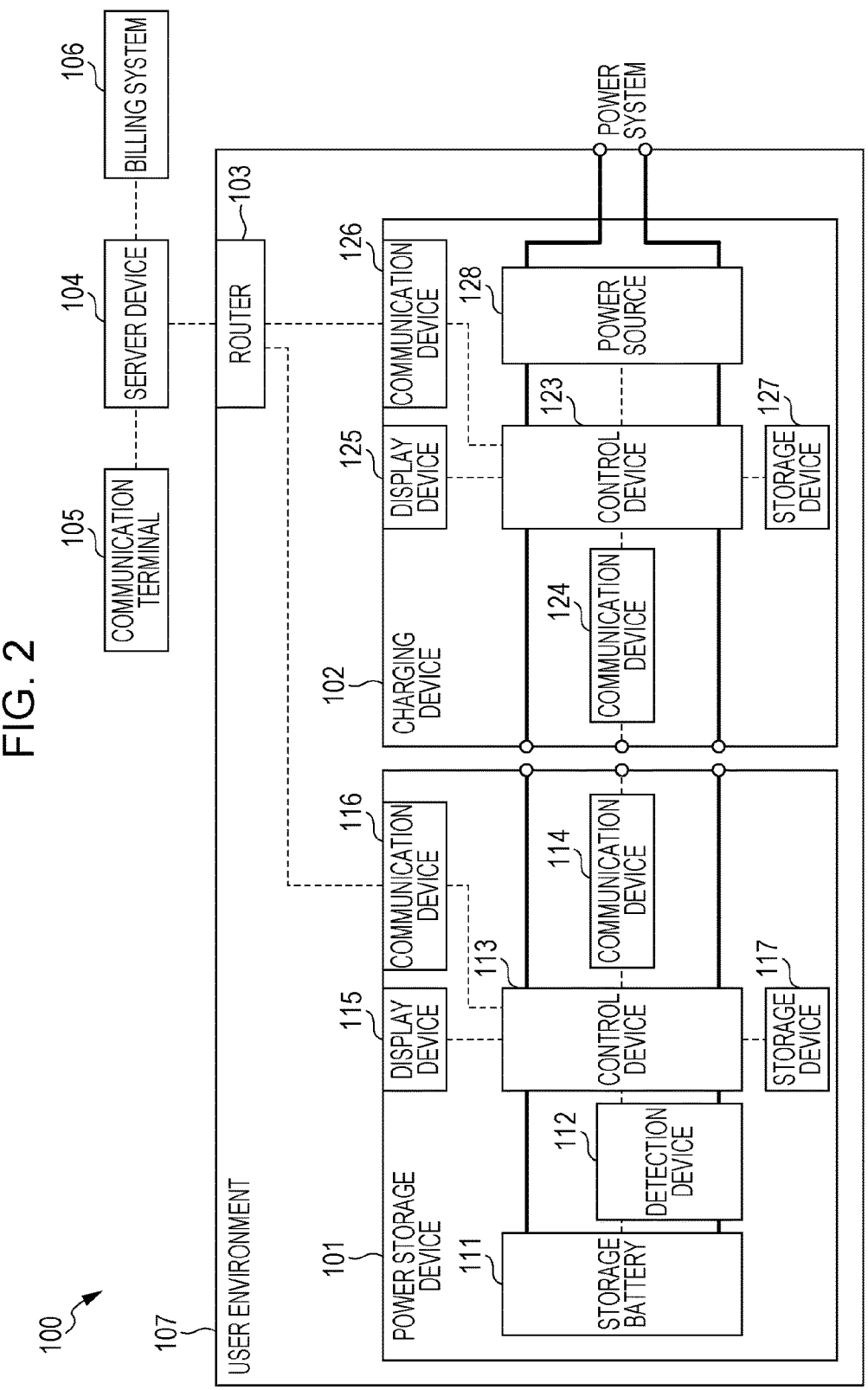
FIG. 2 is a block diagram depicting a configuration of a power storage device, a charging device, and the like in the embodiment.

FIG. 2 is a block diagram depicting a configuration of the power storage device 101, the charging device 102, and the like depicted in FIG. 1.

The power storage device 101 is provided with a storage battery 111, a detection device 112, a control device 113, a communication device 114, a display device 115, a communication device 116, and a storage device 117.

The storage battery 111 is a constituent element for storing electrical energy, and is also referred to as a secondary battery or a rechargeable battery. The storage battery 111 may be a cell, may be a unit cell, may be a battery block, or may be a battery pack.

The detection device 112 is a constituent element for detecting the state of the storage battery 111. For example, the detection device 112 detects the charging voltage, the discharging voltage, the internal resistance, and the like of the storage battery 111. Specifically, the detection device 112 may be a voltmeter or may be an ammeter.

The control device 113 is a constituent element for controlling an operation of the power storage device 101. For example, the control device 113 may control a converter (not depicted) that controls the charging or discharging of the storage battery 111. The control device 113 may acquire a charging instruction from the charging device 102 via the communication device 114, and control charging of the storage battery 111 in accordance with the charging instruction. Furthermore, the control device 113 may acquire the state of the storage battery 111 from the detection device 112, and control charging or discharging of the storage battery 111 in accordance with the state of the storage battery 111.

Furthermore, the control device 113 may acquire the state of the storage battery 111 from the detection device 112, and display the state of the storage battery 111 on the display device 115. Furthermore, the control device 113 may notify the state of the storage battery 111 to the charging device 102 via the communication device 114. Furthermore, the control device 113 may notify the state of the storage battery 111 to the server device 104 via the communication device 116 or the like. Furthermore, the control device 113 may store the state of the storage battery 111 in the storage device 117.

Furthermore, the control device 113 may acquire identification information of the power storage device 101 from the storage device 117, and transmit the identification information of the power storage device 101 to the charging device 102 via the communication device 114. Alternatively, the control device 113 may acquire identification information of the power storage device 101 from the storage device 117, and acquire identification information of the charging device 102 from the charging device 102 via the communication device 114. The control device 113 may then transmit the identification information of the power storage device 101 and the identification information of the charging device 102 to the server device 104 via the communication device 116 or the like.

Furthermore, the control device 113 may acquire information indicating the possibility of charging the power storage device 101 from the server device 104 via the communication device 116 or the like. Alternatively, the control device 113 may acquire information indicating the possibility of charging the power storage device 101 from the charging device 102 via the communication device 114.

The control device 113 may then control the possibility of charging, in accordance with the information indicating the possibility of charging. That is, the control device 113 may permit charging of the storage battery 111 when the information indicating the possibility of charging indicates that charging is possible, and prohibit charging of the storage battery 111 when the information indicating the possibility of charging indicates that charging is not possible.

Furthermore, the control device 113 may be provided with a computation processor and a storage device that stores a program. The computation processor of the control device 113 may be an MPU or a CPU. The storage device of the control device 113 may be a volatile memory or may be a nonvolatile memory. The control device 113 may be constituted by an individual control device that implements centralized control, or may be constituted by a plurality of control devices that cooperate with each other to implement distributed control.

The communication device 114 is a constituent element for the power storage device 101 to communicate with the charging device 102 and the like. The communication device 114 may be a processing circuit including a communication interface. Specifically, the communication device 114 communicates with the charging device 102 in accordance with control implemented by the control device 113.

For example, the communication device 114 may transmit the identification information of the power storage device 101 to the charging device 102. Furthermore, the communication device 114 may receive the identification information of the charging device 102 from the charging device 102. Furthermore, the communication device 114 may receive the information indicating the possibility of charging the power storage device 101 from the charging device 102. Furthermore, the communication device 114 may transmit the information indicating the state of the storage battery 111 to the charging device 102.

As mentioned above, the power storage device 101 and the charging device 102 are connected, and therefore the communication device 114 may communicate with the charging device 102 by means of wired communication. Alternatively, the communication device 114 may communicate with the charging device 102 on the basis of the IEEE 802.15.1 specification, which is the international standard specification for short-range wireless communication represented by Bluetooth (registered trademark).

The display device 115 is a constituent element for displaying information. Specifically, the display device 115 may be a liquid crystal panel or may be an indicator. For example, the display device 115 may display the state of the storage battery 111 in accordance with control implemented by the control device 113.

The communication device 116 is a constituent element for the power storage device 101 to communicate with the server device 104 and the like. The communication device 116 may be a processing circuit including a communication interface. Specifically, the communication device 116 communicates with the server device 104 via the router 103 in accordance with control implemented by the control device 113.

For example, the communication device 116 may transmit the identification information of the power storage device 101 and the identification information of the charging device 102 to the server device 104 via the router 103. Furthermore, the communication device 116 may receive the information indicating the possibility of charging the power storage device 101 from the server device 104 via the router 103.

Furthermore, the communication device 116 may communicate with the router 103 on the basis of the IEEE 802.11 specification, which is the international standard specification for wireless communication represented by wireless LAN or Wi-Fi (registered trademark), when communicating with the server device 104 via the router 103.

The storage device 117 is a constituent element for storing information. Specifically, the storage device 117 may be a nonvolatile memory. Furthermore, the storage device 117 may be a read-only memory, namely a non-rewritable memory. The identification information of the power storage device 101 is stored in storage device 117, for example.

The charging device 102 is provided with a control device 123, a communication device 124, a display device 125, a communication device 126, a storage device 127, and a power source 128.

The control device 123 is a constituent element for controlling an operation of the charging device 102. For example, the control device 123 may control a converter (not depicted) that is provided in the charging device 102 and controls the charging of the power storage device 101. Alternatively, the control device 123 may control the charging of the power storage device 101 by controlling the power supply of the power source 128.

The control device 123 may acquire the state of the storage battery 111 from the power storage device 101 via the communication device 124, and control the charging of the power storage device 101 in accordance with the state of the storage battery 111. Furthermore, the control device 123 may display the state of the storage battery 111 on the display device 125. Furthermore, the control device 123 may notify the state of the storage battery 111 to the server device 104 via the communication device 126 or the like. Furthermore, the control device 123 may store the state of the storage battery 111 in the storage device 127.

Furthermore, the control device 123 may acquire identification information of the charging device 102 from the storage device 127, and transmit the identification information of the charging device 102 to the power storage device 101 via the communication device 124. Alternatively, the control device 123 may acquire identification information of the charging device 102 from the storage device 127, and acquire identification information of the power storage device 101 from the power storage device 101 via the communication device 124. The control device 123 may then transmit the identification information of the power storage device 101 and the identification information of the charging device 102 to the server device 104 via the communication device 126 or the like.

Furthermore, the control device 123 may acquire information indicating the possibility of charging the power storage device 101 from the server device 104 via the communication device 126 or the like. Alternatively, the control device 123 may acquire information indicating the possibility of charging the power storage device 101 from the power storage device 101 via the communication device 124.

The control device 123 may then control the possibility of charging, in accordance with the information indicating the possibility of charging. That is, the control device 123 may permit charging of the power storage device 101 when the information indicating the possibility of charging indicates that charging is possible, and prohibit charging of the power storage device 101 when the information indicating the possibility of charging indicates that charging is not possible. For example, the control device 123 is able to control the possibility of charging, by controlling power supplied from the power source 128 to the power storage device 101.

Furthermore, the control device 123 may be provided with a computation processor and a storage device that stores a program. The computation processor of the control device 123 may be an MPU or a CPU. The storage device of the control device 123 may be a volatile memory or may be a nonvolatile memory. The control device 123 may be constituted by an individual control device that implements centralized control, or may be constituted by a plurality of control devices that cooperate with each other to implement distributed control.

The communication device 124 is a constituent element for the charging device 102 to communicate with the charging device 101 and the like. The communication device 124 may be a processing circuit including a communication interface. Specifically, the communication device 124 communicates with the power storage device 101 in accordance with control implemented by the control device 123.

For example, the communication device 124 may transmit the identification information of the charging device 102 to the power storage device 101. Furthermore, the communication device 124 may receive the identification information of the power storage device 101 from the power storage device 101. Furthermore, the communication device 124 may receive the information indicating the possibility of charging the power storage device 101 from the power storage device 101. Furthermore, the communication device 124 may receive the information indicating the state of the storage battery 111 from the power storage device 101.

As mentioned above, the power storage device 101 and the charging device 102 are connected, and therefore the communication device 124 may communicate with the power storage device 101 by means of wired communication. Alternatively, the communication device 124 may communicate with the power storage device 101 on the basis of the IEEE 802.15.1 specification, which is the international standard specification for short-range wireless communication represented by Bluetooth (registered trademark).

The display device 125 is a constituent element for displaying information. Specifically, the display device 125 may be a liquid crystal panel or may be an indicator. For example, the display device 125 may display the state of the storage battery 111 in accordance with control implemented by the control device 123.

The communication device 126 is a constituent element for the charging device 102 to communicate with the server device 104 and the like. The communication device 126 may be a processing circuit including a communication interface. Specifically, the communication device 126 communicates with the server device 104 via the router 103 in accordance with control implemented by the control device 123.

For example, the communication device 126 may transmit the identification information of the power storage device 101 and the identification information of the charging device 102 to the server device 104 via the router 103. Furthermore, the communication device 126 may receive the information indicating the possibility of charging the power storage device 101 from the server device 104 via the router 103.

Furthermore, the communication device 126 may communicate with the router 103 on the basis of the IEEE 802.11 specification, which is the international standard specification for wireless communication represented by wireless LAN or Wi-Fi (registered trademark), when communicating with the server device 104 via the router 103. Alternatively, the communication device 126 may communicate with the router 103 on the basis of the IEEE 802.3 specification, which is the international standard specification for wired communication represented by wired LAN.

The storage device 127 is a constituent element for storing information. Specifically, the storage device 127 may be a nonvolatile memory. Furthermore, the storage device 127 may be a read-only memory, namely a non-rewritable memory. The identification information of the charging device 102 is stored in the storage device 127, for example.

The power source 128 is a constituent element for supplying power to the power storage device 101. Specifically, the power source 128 is an electrical circuit for supplying power from a power system to the power storage device 101. The power source 128 is provided with a converter for controlling charging of the power storage device 101. For example, the power source 128 converts alternating-current power supplied from a power system into direct-current power having a predetermined voltage, and supplies the direct-current power having the predetermined voltage to the power storage device 101, in accordance with control implemented by the control device 123. The power storage device 101 is thereby charged.

A billing system 106 is a constituent element for carrying out billing processing. Specifically, the billing system 106 may be an information processing device such as a computer. Furthermore, the billing system 106 may be made up of a plurality of devices. The billing system 106 calculates a fee for the rental of the power storage device 101, for example. More specifically, the billing system 106 adds a charging fee to the fee for the rental of the power storage device 101 each time the power storage device 101 is charged.

A user environment 107 is a place where charging is carried out. The user environment 107 may be the house of the borrower of the power storage device 101, or may be an office, for example. Furthermore, here, charging is carried out in the user environment 107; however, charging may be carried out in a place that is different from the user environment 107.

It should be noted that one from among the communication device 116 of the power storage device 101 and the communication device 126 of the charging device 102 does not need to be provided. That is, it is permissible for one from among the power storage device 101 and the charging device 102 to be able to communicate with the server device 104 and for the other to not be able to communicate with the server device 104.

Furthermore, in the power storage device 101, the communication device 114 and the communication device 116 may make up one communication device. Furthermore, in the charging device 102, the communication device 124 and the communication device 126 may make up one communication device. For example, the power storage device 101 may be provided with one wireless communication device, and the one wireless communication device of the power storage device 101 may operate as the communication device 114 and the communication device 116. Furthermore, the charging device 102 may be provided with one wireless communication device, and the one wireless communication device of the charging device 102 may operate as the communication device 124 and the communication device 126.

Figure 3:
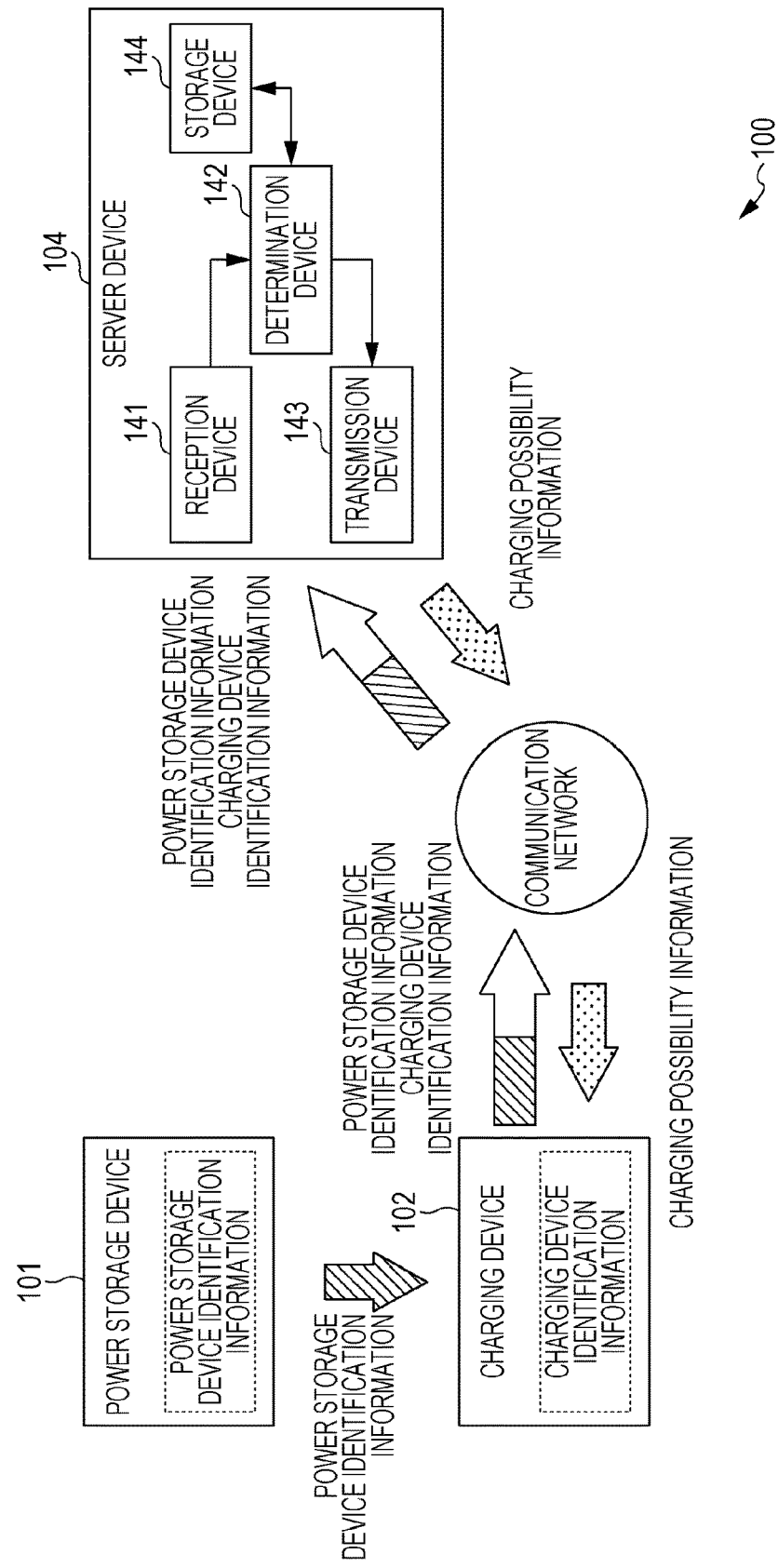
FIG. 3 is a conceptual diagram depicting the transition of data in the case where identification information is transmitted from the charging device in the embodiment.

FIG. 3 is a conceptual diagram depicting the transition of data in the case where power storage device identification information and charging device identification information are transmitted from the charging device 102 depicted in FIG. 1 and the like. As depicted in FIG. 3, the server device 104 is provided with a reception device 141, a determination device 142, a transmission device 143, and a storage device 144.

The reception device 141 is an example of a reception device of the present disclosure, and is a constituent element for receiving information. Specifically, the reception device 141 may be a processing circuit including a communication interface. For example, the reception device 141 receives power storage device identification information and charging device identification information via a communication network such as the Internet from at least one of the charging device 102 and the power storage device 101.

Here, the power storage device identification information is the identification information of the power storage device 101. The power storage device identification information may include individual identification information of the power storage device 101. The individual identification information of the power storage device 101 is identification information that is uniquely assigned to the power storage device 101, and is identification information for uniquely identifying the power storage device 101 from a plurality of power storage devices. The individual identification information of the power storage device 101 is a serial number assigned to the power storage device 101, for example.

In addition, the power storage device identification information may include manufacturing information of the power storage device 101. The manufacturing information of the power storage device 101 is information relating to the manufacture of the power storage device 101, and, for example, is the manufacturer information, the manufacture date, the manufacture lot number, or the like. In addition, the power storage device identification information may include design information of the power storage device 101. The design information of the power storage device 101 is information relating to the design of the power storage device 101, and, for example, is the product number, the rated voltage, the rated current, the configuration of the storage battery 111 provided in the power storage device 101, the capacity of the storage battery 111, and the like.

Furthermore, the charging device identification information is the identification information of the charging device 102. The charging device identification information may include individual identification information of the charging device 102. The individual identification information of the charging device 102 is identification information that is uniquely assigned to the charging device 102, and is identification information for uniquely identifying the charging device 102 from a plurality of charging devices. The individual identification information of the charging device 102 is a serial number assigned to the charging device 102, for example.

In addition, the charging device identification information may include manufacturing information of the charging device 102. The manufacturing information of the charging device 102 is the manufacturer information, the manufacture date, the manufacture lot number, and the like of the charging device 102. In addition, the charging device identification information may include design information of the charging device 102. The design information of the charging device 102 is the product number, the rated voltage, the rated current, and the like of the charging device 102.

The determination device 142 is an example of a determination device of the present disclosure, and is a constituent element for determining the possibility of charging. The determination device 142 may be a processing circuit that determines the possibility of charging. The determination device 142 determines the possibility of charging the power storage device 101, on the basis of the power storage device identification information and the charging device identification information, for example.

Specifically, the determination device 142 may determine the possibility of charging the power storage device 101, on the basis of whether or not the association between the power storage device identification information and the charging device identification information received corresponds with the association between the power storage device identification information and the charging device identification information stored in the storage device 144.

For example, the determination device 142 determines that it is possible to charge the power storage device 101 when the association between the power storage device identification information and the charging device identification information received corresponds with the association between the power storage device identification information and the charging device identification information stored in the storage device 144. Also, the determination device 142 determines that it is not possible to charge the power storage device 101 when the association between the power storage device identification information and the charging device identification information received does not correspond with the association between the power storage device identification information and the charging device identification information stored in the storage device 144.

Furthermore, the determination device 142 may be a control device that controls an operation of the server device 104. Also, the determination device 142 may be provided with a computation processor and a storage device that stores a program. The computation processor of the determination device 142 may be an MPU or a CPU. The storage device of the determination device 142 may be a volatile memory or may be a nonvolatile memory. The determination device 142 may be constituted by an individual control device that implements centralized control, or may be constituted by a plurality of control devices that cooperate with each other to implement distributed control.

The transmission device 143 is an example of a transmission device of the present disclosure, and is a constituent element for transmitting information. Specifically, the transmission device 143 may be a processing circuit including a communication interface. For example, the transmission device 143 transmits charging possibility information via the communication network such as the Internet to at least one of the charging device 102 and the power storage device 101. Here, the charging possibility information is information indicating the possibility of charging the power storage device 101.

The storage device 144 is an example of a storage device of the present disclosure, and is a constituent element for storing information. Specifically, the storage device 144 may be a nonvolatile memory. The power storage device identification information and the charging device identification information are registered in the storage device 144, for example. That is, the power storage device identification information and the charging device identification information are associated and stored in the storage device 144. The power storage device identification information and the charging device identification information may be registered when the power storage device 101 and the charging device 102 are rented.

Furthermore, information indicating the legitimate owner of the power storage device 101, the legitimate owner of the charging device 102, the communication terminal 105 of the legitimate owner of the power storage device 101, and the communication terminal 105 of the legitimate owner of the charging device 102 may be stored in the storage device 144. The information indicating these may be stored when the power storage device 101 and the charging device 102 are rented.

In the example of FIG. 3, the power storage device 101 is connected to the charging device 102. Also, the power storage device 101 transmits the power storage device identification information to the charging device 102. The charging device 102 receives the power storage device identification information, and transmits the power storage device identification information and the charging device identification information to the server device 104 via the communication network such as the Internet.

The reception device 141 of the server device 104 receives the power storage device identification information and the charging device identification information. The determination device 142 of the server device 104 then determines the possibility of charging the power storage device 101. The transmission device 143 of the server device 104 then transmits charging possibility information to the charging device 102 via the communication network.

The charging device 102 receives the charging possibility information. The charging device 102 may control the charging of the power storage device 101 in accordance with the received charging possibility information. Alternatively, the charging device 102 may transmit the received charging possibility information to the power storage device 101. Then, the power storage device 101 may receive the charging possibility information, and control whether or not charging for the power storage device 101 is to be received.

Figure 4:
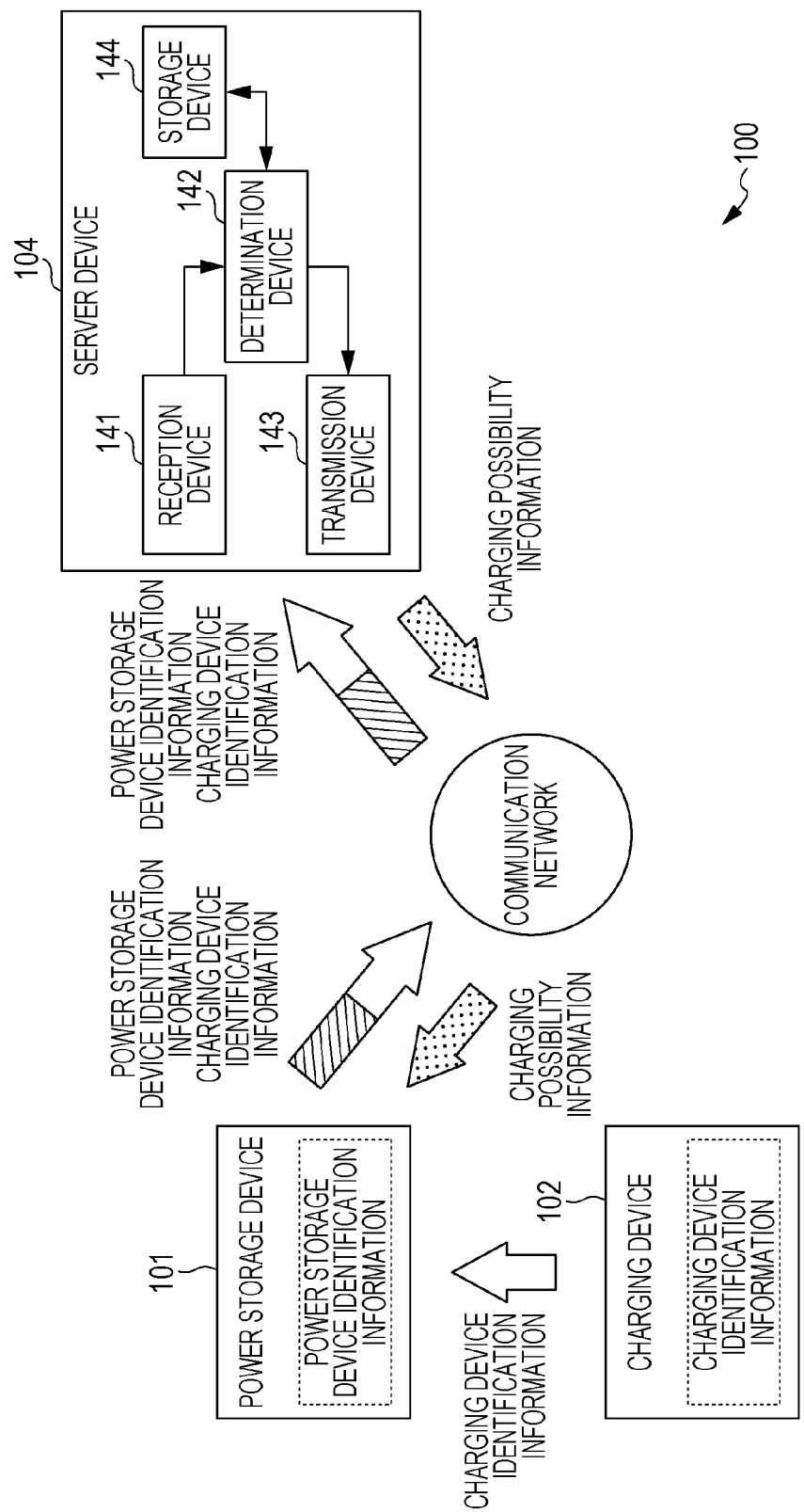
FIG. 4 is a conceptual diagram depicting the transition of data in the case where identification information is transmitted from the power storage device in the embodiment.

FIG. 4 is a conceptual diagram depicting the transition of data in the case where power storage device identification information and charging device identification information are transmitted from the power storage device 101 depicted in FIG. 1 and the like. The server device 104 depicted in FIG. 4 is the same as the server device 104 depicted in FIG. 3.

In the example of FIG. 4, the power storage device 101 is connected to the charging device 102. Also, the charging device 102 transmits the charging device identification information to the power storage device 101. The power storage device 101 receives the charging device identification information, and transmits the power storage device identification information and the charging device identification information to the server device 104 via a communication network such as the Internet.

The reception device 141 of the server device 104 receives the power storage device identification information and the charging device identification information. The determination device 142 of the server device 104 then determines the possibility of charging the power storage device 101. The transmission device 143 of the server device 104 then transmits charging possibility information to the power storage device 101 via the communication network.

The power storage device 101 receives the charging possibility information. The power storage device 101 may control whether or not charging for the power storage device 101 is to be received, in accordance with the received charging possibility information. Alternatively, the power storage device 101 may transmit the received charging possibility information to the charging device 102. Then, the charging device 102 may receive the charging possibility information, and control charging of the power storage device 101 in accordance with the received charging possibility information.

It should be noted that FIGS. 3 and 4 may be combined. For example, the server device 104 may receive the power storage device identification information and the charging device identification information from the charging device 102, and transmit the charging possibility information to the power storage device 101. Alternatively, the server device 104 may receive the power storage device identification information and the charging device identification information from the power storage device 101, and transmit the charging possibility information to the charging device 102.

Furthermore, the server device 104 may receive the charging device identification information and the power storage device identification information from the charging device 102 and the power storage device 101.

Specifically, the charging device 102 may transmit the charging device identification information to the server device 104, and the power storage device 101 may transmit the power storage device identification information to the server device 104. The server device 104 may then receive the charging device identification information from the charging device 102, and receive the power storage device identification information from the power storage device 101.

Alternatively, the charging device 102 may transmit the charging device identification information, and the power storage device identification information received from the power storage device 101, to the server device 104, and the power storage device 101 may transmit the charging device identification information received from the charging device 102, and the power storage device identification information, to the server device 104. The server device 104 may then receive the charging device identification information and the power storage device identification information from the charging device 102, and receive the charging device identification information and the power storage device identification information from the power storage device 101.

The form in which the server device 104 receives the charging device identification information and the power storage device identification information from the charging device 102 and the power storage device 101 may be either of the abovementioned. Furthermore, when transmitting the charging possibility information to the charging device 102 or the power storage device 101, the server device 104 may transmit the charging possibility information to both the charging device 102 and the power storage device 101 rather than to only one of the charging device 102 and the power storage device 101.

Figure 5:
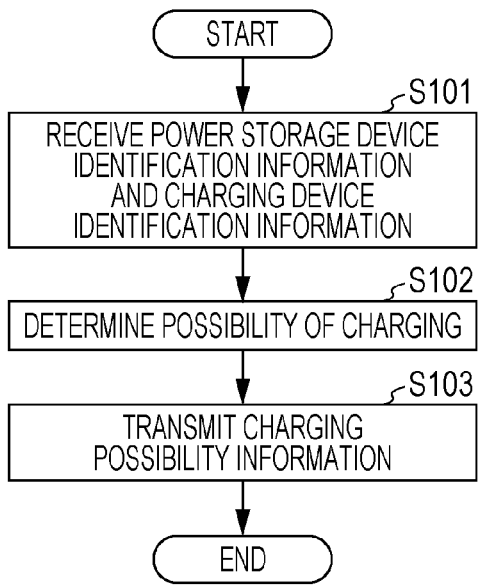
FIG. 5 is a flowchart depicting an operation of a server device in the embodiment.

FIG. 5 is a flowchart depicting an operation of the server device 104 depicted in FIG. 1 and the like. First, the reception device 141 of the server device 104 receives charging device identification information and power storage device identification information from at least one of the charging device 102 and the power storage device 101 (S101). Next, the determination device 142 of the server device 104 determines the possibility of charging the power storage device 101 from the power storage device identification information and the charging device identification information received (S102).

Next, the transmission device 143 of the server device 104 transmits charging possibility information to at least one of the charging device 102 and the power storage device 101 (S103).

As mentioned above, the server device 104 uses both the power storage device identification information and the charging device identification information to determine the possibility of charging. Compared to the power storage device 101, the possibility of the charging device 102 being taken outside and used is low, and the possibility of the charging device 102 being used by an unauthorized person other than the owner of the charging device 102 is low. Consequently, the server device 104, by using both the power storage device identification information and the charging device identification information, is able to suppress the power storage device 101 being used by an unauthorized person. Thus, the server device 104 is able to support the appropriate use of the power storage device 101.

Next, a more specific operation of the charging system 100 depicted in FIG. 1 and the like will be described using FIGS. 6, 7, and 8.

Figure 6:
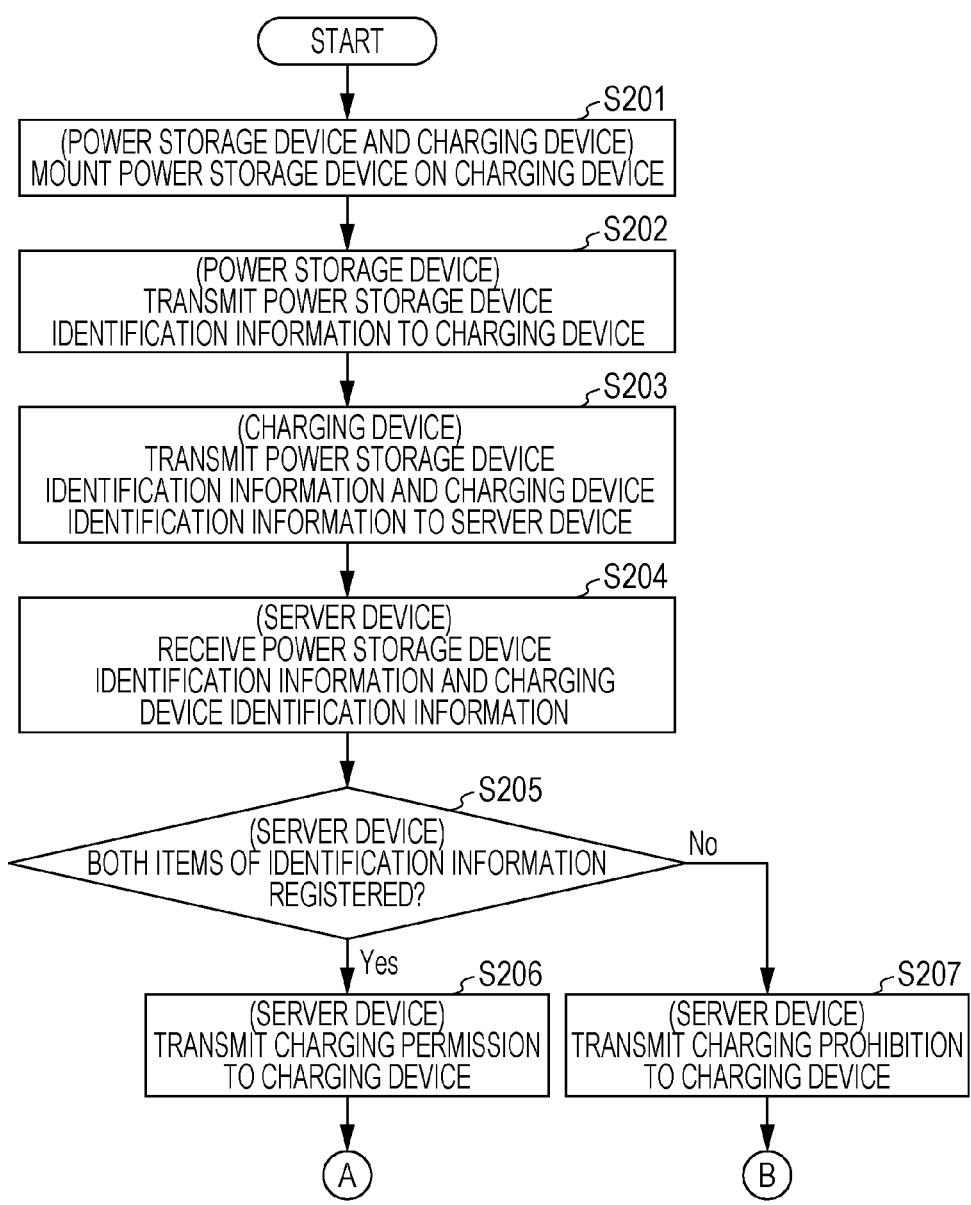
FIG. 6 is a flowchart depicting the operation of the charging system in the embodiment.
Figure 7:
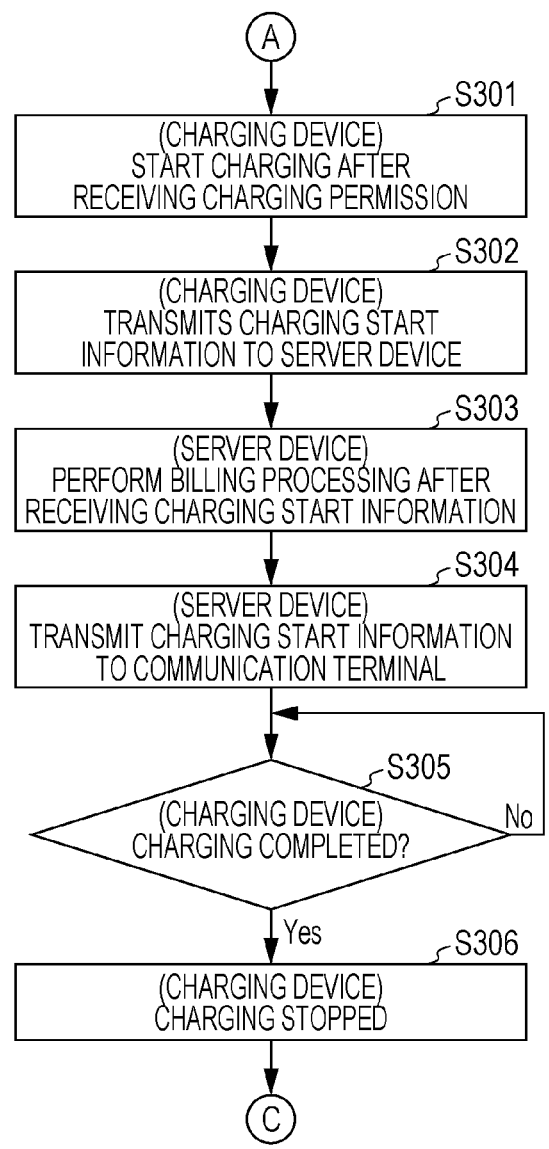
FIG. 7 is a flowchart depicting the operation of the charging system in the embodiment.
Figure 8:
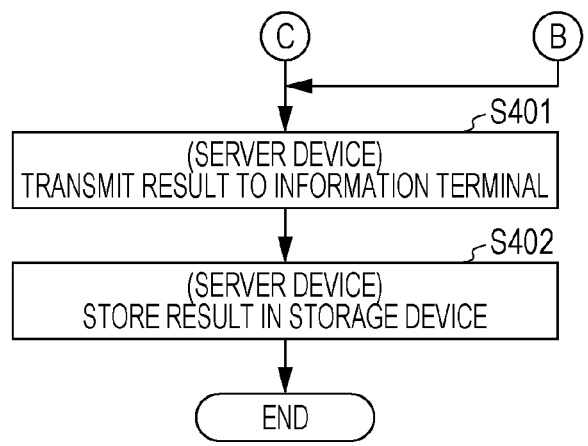
FIG. 8 is a flowchart depicting the operation of the charging system in the embodiment.

FIGS. 6, 7, and 8 are flowcharts depicting the operation of the charging system 100 depicted in FIG. 1 and the like.

First, the power storage device 101 is mounted on the charging device 102 (S201). That is, the power storage device 101 is connected to the charging device 102 for charging.

Next, the power storage device 101 transmits power storage device identification information to the charging device 102 (S202). Specifically, the power storage device 101 acquires power storage device identification information from the storage device 117 of the power storage device 101, and transmits the power storage device identification information to the charging device 102. The charging device 102 receives the power storage device identification information transmitted from the power storage device 101.

Next, the charging device 102 transmits the power storage device identification information and charging device identification information to the server device 104 (S203). Specifically, the charging device 102 acquires the charging device identification information from the storage device 127 of the charging device 102. The charging device 102 then transmits the power storage device identification information received from the power storage device 101 and the charging device identification information acquired from the storage device 127 to the server device 104.

It should be noted that, here, the power storage device identification information is transmitted from the power storage device 101 to the charging device 102, and the power storage device identification information and the charging device identification information are transmitted from the charging device 102 to the server device 104. However, the charging device identification information may be transmitted from the charging device 102 to the power storage device 101, and the power storage device identification information and the charging device identification information may be transmitted from the power storage device 101 to the server device 104.

Next, the server device 104 receives the power storage device identification information and the charging device identification information (S204). The server device 104 then determines whether or not the power storage device identification information and the charging device identification information received are registered (S205). That is, the server device 104 determines whether or not the power storage device identification information and the charging device identification information received, and the power storage device identification information and the charging device identification information associated and stored in the storage device 144 of the server device 104 correspond.

Then, if the power storage device identification information and the charging device identification information received are registered (yes in S205), the server device 104 transmits information indicating that charging is permitted to the charging device 102 (S206). If the power storage device identification information and the charging device identification information received are not registered (no in S205), the server device 104 transmits information indicating that charging is prohibited to the charging device 102 (S207). It should be noted that the transmission of information indicating that charging is prohibited may be omitted.

The charging device 102 starts charging the power storage device 101 after receiving information indicating that charging is permitted from the server device 104 (S301). The charging device 102 then transmits charging start information indicating that charging has been started to the server device 104 (S302).

It should be noted that the server device 104 may transmit information indicating that charging is permitted or prohibited to the power storage device 101, instead of transmitting information indicating that charging is permitted or prohibited to the charging device 102. The power storage device 101 may then start receiving charging for the power storage device 101 after receiving information indicating that charging is permitted from the server device 104. The power storage device 101 may then transmit charging start information to the server device 104.

Alternatively, the power storage device 101 may transmit information indicating that charging is permitted to the charging device 102 after receiving information indicating that charging is permitted from the server device 104. The charging device 102 may then start charging the power storage device 101 after receiving the information indicating that charging is permitted from the power storage device 101. The charging device 102 may then transmit charging start information to the server device 104.

The server device 104 carries out billing processing after receiving the charging start information (S303). For example, when including the billing system 106, the server device 104 adds a fee for charging the power storage device 101 to a fee for renting the power storage device 101. When not including the billing system 106, the server device 104 may notify the start of charging to an external billing system 106.

Next, the charging device 102 determines whether or not the charging has been completed (S305). The charging device 102 then repeatedly determines whether or not the charging has been completed, until the charging has been completed. The charging device 102 then stops the charging if the charging has been completed (S306). It should be noted that the charging device 102 stops the charging also in the case where it has been detected that there is an abnormal increase in the voltage of the power storage device 101, an abnormal increase in the current of the power storage device 101, an abnormal increase in the temperature of the power storage device 101, or the like. The charging device 102 stops the charging also in the case where the power storage device 101 has been detached from the charging device 102.

Thereafter, the server device 104 transmits a charging result to the communication terminal 105 (S401). In the present example, information indicating that charging is permitted or information indicating that charging is prohibited is included in the charging result. It should be noted that a mode is permissible in which the server device 104 transmits information indicating that charging is prohibited to the communication terminal 105 only in the case where charging has been prohibited with the charging result including information indicating that charging is prohibited and not including information indicating that charging is permitted. That is, it is desirable for the charging result to include at least information indicating that charging is prohibited. Furthermore, the charging result may include normal termination information indicating that charging of the power storage device 101 has terminated normally, abnormal termination information indicating that charging has terminated abnormally, a charging start time, a charging termination time, information indicating the state of the power storage device 101 during charging or after charging has terminated, and the like. The abovementioned normal termination information and abnormal termination information are transmitted to the server device 104 from at least one of the power storage device 101 and the charging device 102. The server device 104 then stores the charging result in the storage device 144 (S402).

In the abovementioned operation, charging is not carried out if the power storage device identification information and the charging device identification information received by the server device 104 are not registered (no in S205). Consequently, the power storage device 101 being used by an unauthorized person is suppressed. Furthermore, the occurrence of inappropriate billing to the borrower of the power storage device 101 is suppressed. Thus, the server device 104 is able to support the appropriate use of the power storage device 101.

Figure 9:
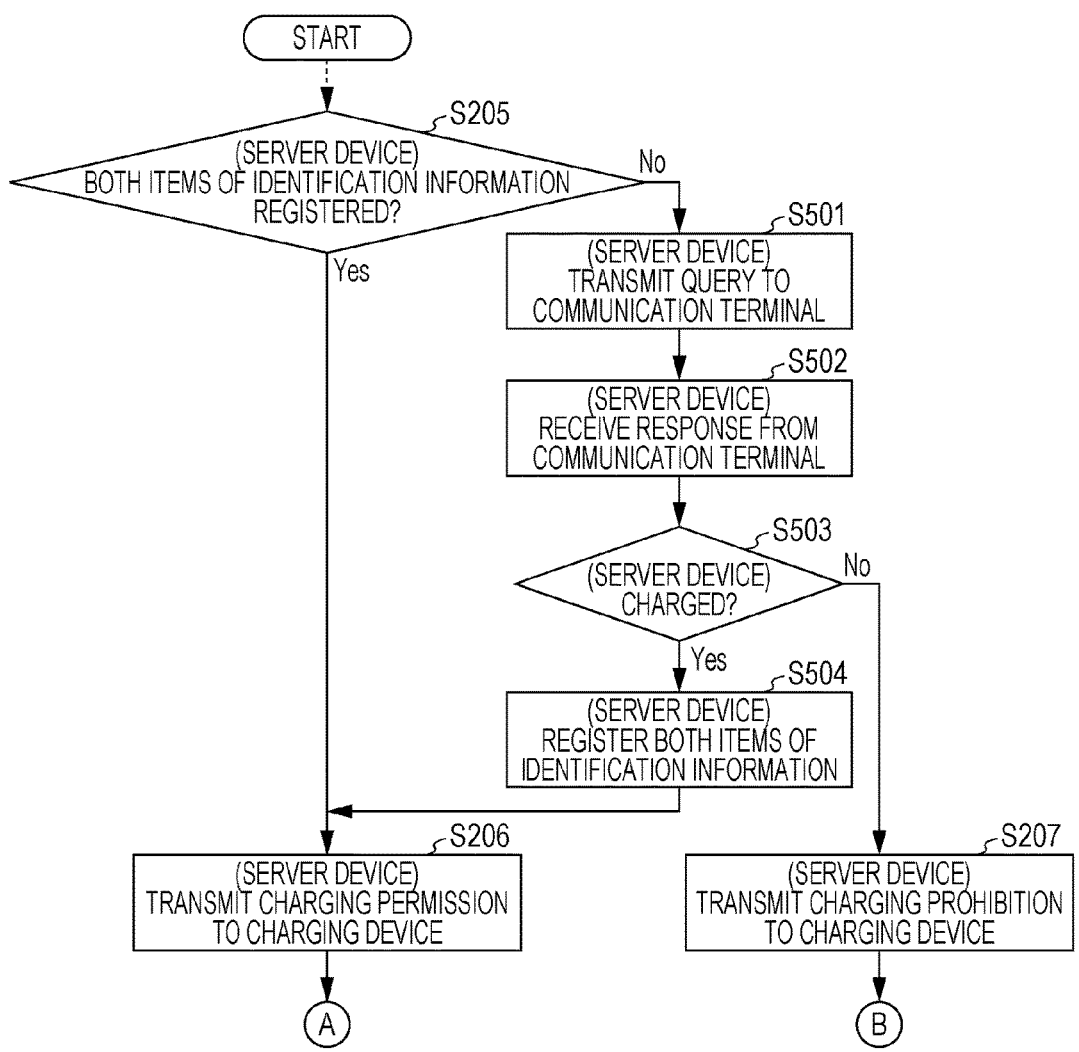
FIG. 9 is a flowchart depicting a first modified example of the operation of the charging system in the embodiment.

FIG. 9 is a flowchart depicting a first modified example of the operation of the charging system 100 depicted in FIG. 1 and the like. Specifically, FIG. 9 depicts a first modified example of the operation depicted in FIG. 6.

In the example of FIG. 6, charging is carried out if the power storage device identification information and the charging device identification information received by the server device 104 are registered (yes in S205), and charging is not carried out if these are not registered (no in S205). In the present modified example, if these are not registered (no in S205), a query is transmitted to the communication terminal 105 of the legitimate owner of the power storage device 101 or the charging device 102, and the possibility of charging is controlled on the basis of the response thereto.

Specifically, similar to the example in FIG. 6, the server device 104 determines whether or not the charging device identification information and the power storage device identification information received are registered (S205). Then, if the power storage device identification information and the charging device identification information received are registered (yes in S205), the server device 104 transmits information indicating that charging is permitted to the charging device 102 (S206). The server device 104 may transmit information indicating that charging is permitted to the power storage device 101.

If the power storage device identification information and the charging device identification information received are not registered (no in S205), the server device 104 transmits a query regarding the possibility of charging the power storage device 101 to the external communication terminal 105 (S501). The communication terminal 105 is at least one of a communication terminal of the legitimate owner of the power storage device 101 and a communication terminal of the legitimate owner of the charging device 102. For example, the legitimate owner of the power storage device 101 is the borrower of the power storage device 101, and the legitimate owner of the charging device 102 is the borrower of the charging device 102.

The server device 104 may transmit a query to the communication terminal 105 of the legitimate owner of the power storage device 101, or may transmit a query to the communication terminal 105 of the legitimate owner of the charging device 102. Furthermore, the server device 104 may transmit a query to both the communication terminal 105 of the legitimate owner of the power storage device 101 and the communication terminal 105 of the legitimate owner of the charging device 102.

The server device 104 then receives a response to the query from the communication terminal 105 (S502). The server device 104 then determines whether the response indicates that charging is possible or whether the response indicates that charging is not possible (S503).

Here, in the case where the response indicates that charging is possible (yes in S503), the server device 104 registers the power storage device identification information and the charging device identification information received. That is, the server device 104 associates and stores the power storage device identification information and the charging device identification information received, in the storage device 144.

After associating and storing the power storage device identification information and the charging device identification information received, in the storage device 144, the server device 104 transmits information indicating that charging is permitted to the charging device 102 (S206). The server device 104 may transmit information indicating that charging is permitted to the power storage device 101.

Here, in the case where the response does not indicate that charging is possible (no in S503), in other words, in the case where the response indicates that charging is not possible, the server device 104 transmits information indicating that charging is prohibited to the charging device 102 (S207). The server device 104 may transmit information indicating that charging is prohibited to the power storage device 101. Furthermore, the transmission of information indicating that charging is prohibited may be omitted.

Furthermore, for example, in the case where a response indicating that charging is possible is received from one or both of the communication terminal 105 of the owner of the power storage device 101 and the communication terminal 105 of the owner of the charging device 102, the server device 104 may register the power storage device identification information and the charging device identification information. Then, in this case, the server device 104 may transmit information indicating that charging is permitted to at least one of the charging device 102 and the power storage device 101.

Furthermore, for example, in the case where a response indicating that charging is not possible is received from one or both of these two communication terminals 105, the server device 104 may not register the power storage device identification information and the charging device identification information. Then, in this case, the server device 104 may transmit information indicating that charging is prohibited to at least one of the charging device 102 and the power storage device 101.

According to the abovementioned operation, the server device 104, as appropriate, is able to issue a query regarding the possibility of charging to at least one of the legitimate owner of the power storage device 101 and the legitimate owner of the charging device 102. The server device 104 is then able to appropriately determine the possibility of charging the power storage device 101, on the basis of the information stored in the storage device 144 or the response to the query.

Furthermore, in the abovementioned operation, the server device 104 registers the power storage device identification information and the charging device identification information on the basis of the response to the query (S504). That is, the server device 104 associates and stores the power storage device identification information and the charging device identification information in the storage device 144 on the basis of the response to the query. The server device 104 is thereby able to omit the transmission of a query when the next charging is carried out and omit the reception of a response.

It should be noted that the processing for registering the power storage device identification information and the charging device identification information on the basis of the response to the query (S504) may be omitted. In this case, the server device 104 may determine the possibility of charging by transmitting a query and receiving a response each time charging is carried out.

Figure 10:
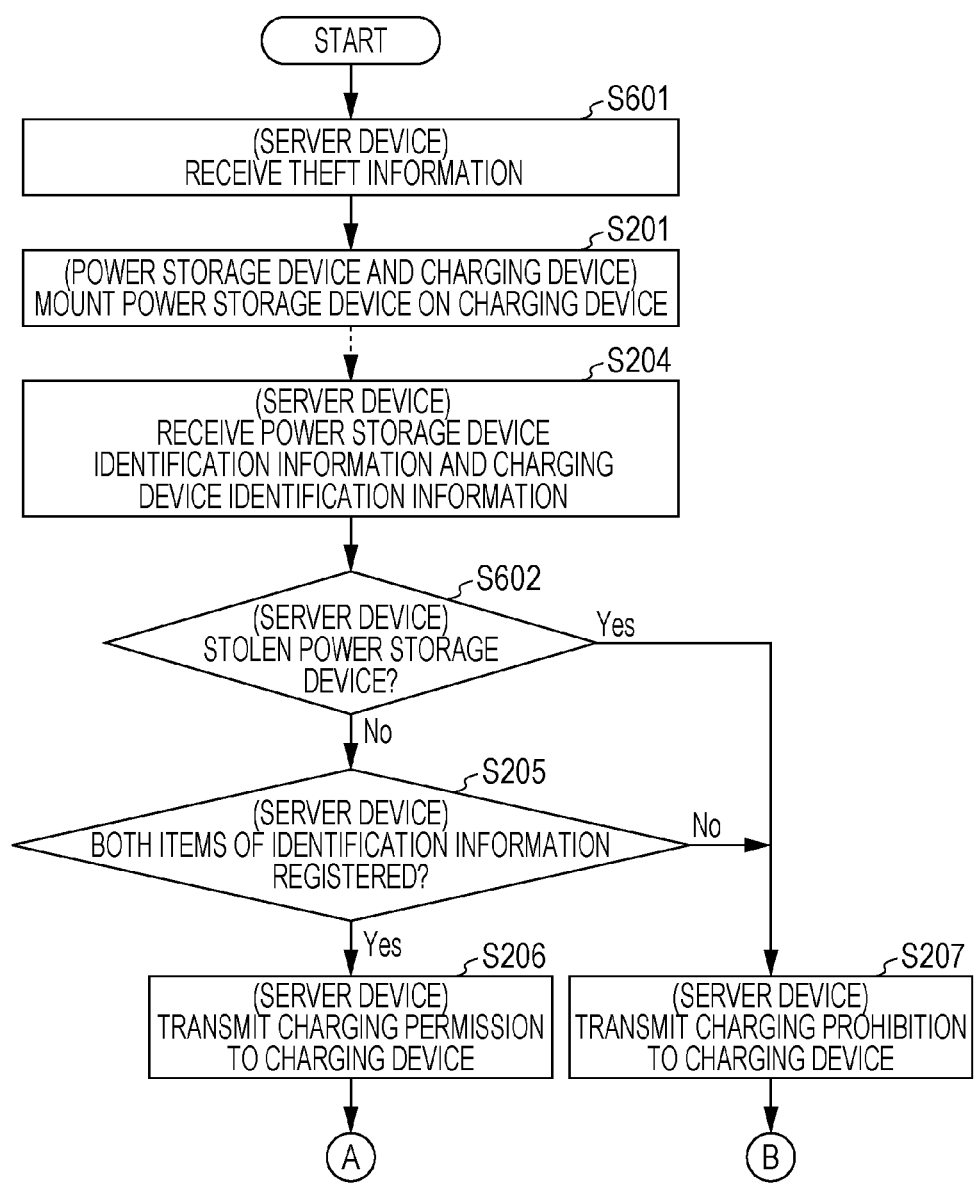
FIG. 10 is a flowchart depicting a second modified example of the operation of the charging system in the embodiment.

FIG. 10 is a flowchart depicting a second modified example of the operation of the charging system 100 depicted in FIG. 1 and the like. Specifically, FIG. 10 depicts a second modified example of the operation depicted in FIG. 6. In the present modified example, if the power storage device 101 is stolen, charging is prohibited regardless of whether or not the power storage device identification information and the charging device identification information are registered.

Specifically, first, the server device 104 receives theft information (S601). The theft information, for example, includes information indicating that the power storage device 101 has been stolen, and identification information of the stolen power storage device 101. The server device 104 may receive the theft information from the communication terminal 105, or may receive the theft information from another device. Hereinafter, there are cases where the theft information for the stolen power storage device 101 is referred to as stolen power storage device identification information.

The same operation as the operation depicted in FIG. 6 is then carried out from the power storage device 101 being mounted on the charging device 102 (S201) to the server device 104 receiving the power storage device identification information and the charging device identification information (S204).

Next, the server device 104 determines whether or not the power storage device 101 has been stolen (S602).

For example, if the power storage device identification information received together with the charging device identification information corresponds with stolen power storage device identification information received together with information indicating that the power storage device 101 has been stolen, the server device 104 determines that the power storage device 101 has been stolen. On the other hand, if the power storage device identification information received together with the charging device identification information does not correspond with stolen power storage device identification information received together with information indicating that the power storage device 101 has been stolen, the server device 101 determines that the power storage device 104 has not been stolen.

Here, the server device 104, if having determined that the power storage device 101 has been stolen (yes in S602), transmits information indicating that charging is prohibited to the charging device 102 (S207).

On the other hand, the server device 104, if having determined that the power storage device 101 has not been stolen (no in S602), similar to the operation depicted in FIG. 6, determines whether or not the power storage device identification information and the charging device identification information received are registered (S205). In accordance with the determination result, the server device 104 then transmits information indicating that charging is permitted or charging is prohibited to the charging device 102 (S206 or S207).

According to the abovementioned operation, the server device 104 is able to suppress use of the stolen power storage device 101. Consequently, the server device 104 is able to suppress the inappropriate use of the power storage device 101, and is able to support the appropriate use of the power storage device 101.

It should be noted that, in the example in FIG. 10, similar to the example in FIG. 6, the information indicating that charging is permitted or charging is prohibited may be transmitted to the power storage device 101. Furthermore, the transmission of information indicating that charging is prohibited may be omitted. Furthermore, the example in FIG. 10 may be combined with the example in FIG. 9.

For example, in the case where the power storage device identification information and the charging device identification information are not registered (no in S205), the transmission of a query (S501), the reception of a response (S502), and the like may be carried out. Then, in the case where the power storage device 101 has been stolen (yes in S602), the transmission of a query (S501), the reception of a response (S502), and the like may not be carried out. Alternatively, in the case where the power storage device 101 has been stolen (yes in S602), the transmission of a query (S501), the reception of a response (S502), and the like may be carried out.

Figure 11:
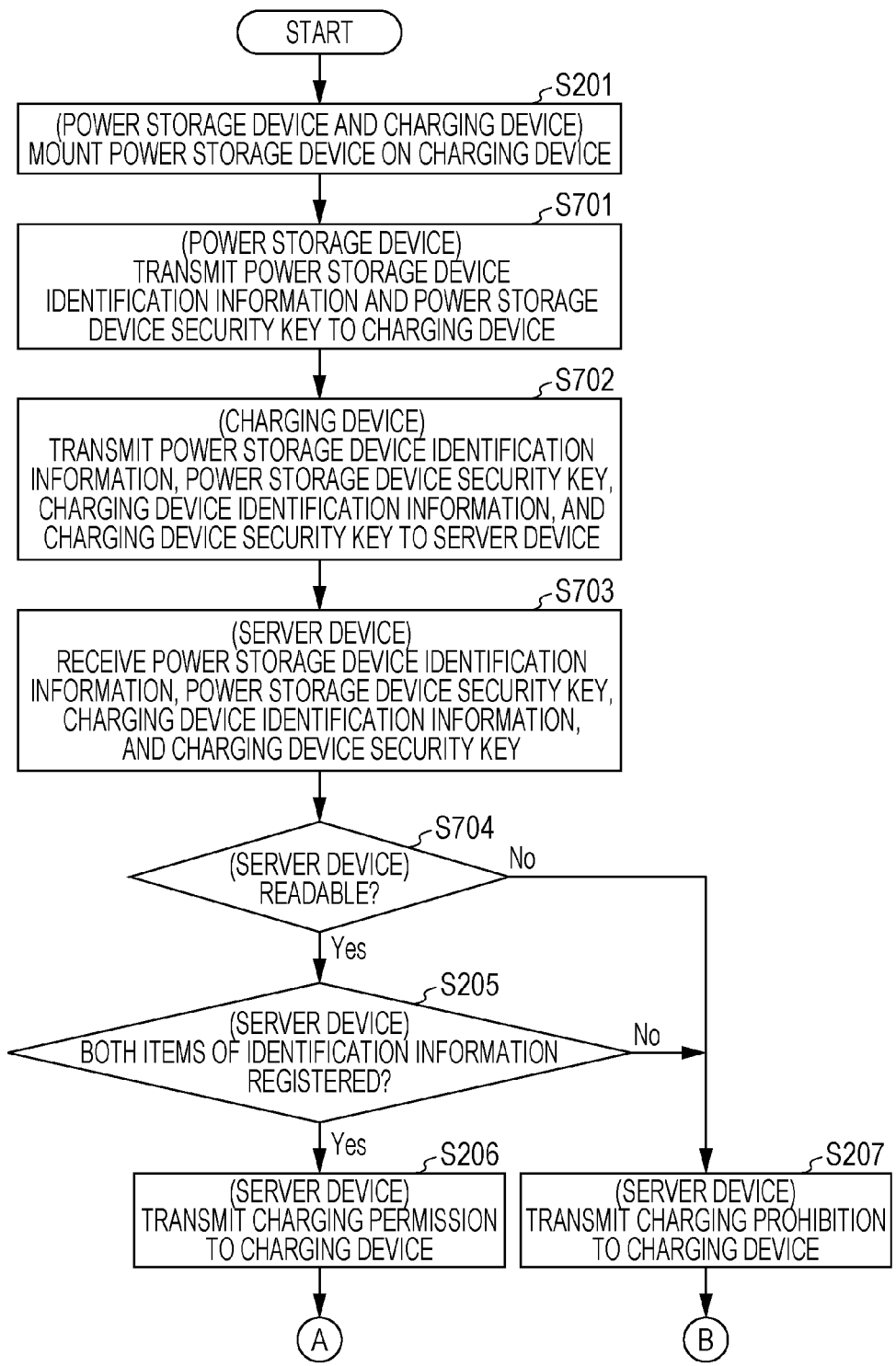
FIG. 11 is a flowchart depicting a third modified example of the operation of the charging system in the embodiment.

FIG. 11 is a flowchart depicting a third modified example of the operation of the charging system 100 depicted in FIG. 1 and the like. Specifically, FIG. 11 depicts a third modified example of the operation depicted in FIG. 6.

In the present modified example, the possibility of reading the power storage device identification information and the charging device identification information is determined by means of a power storage device security key and a charging device security key. The security keys are made up of character strings, for example. The power storage device security key is a security key for the power storage device 101, and is information that is used to determine the possibility of reading the power storage device identification information. The charging device security key is a security key for the charging device identification information, and is information that is used to determine the possibility of reading the charging device identification information.

Specifically, in the present modified example, first, similar to the example in FIG. 6, the power storage device 101 is mounted on the charging device 102 (S201).

Next, the power storage device 101 transmits the power storage device identification information and the power storage device security key to the charging device 102 (S701). Specifically, the power storage device 101 acquires the power storage device identification information and the power storage device security key from the storage device 117 of the power storage device 101, and transmits the power storage device identification information and the power storage device security key to the charging device 102. The charging device 102 receives the power storage device identification information and the power storage device security key transmitted from the power storage device 101.

Next, the charging device 102 transmits the power storage device identification information, the power storage device security key, the charging device identification information, and the charging device security key to the server device 104 (S702).

Specifically, the charging device 102 acquires the charging device identification information and the charging device security key from the storage device 127 of the charging device 102. The charging device 102 then transmits the power storage device identification information and the power storage device security key received from the power storage device 101, and the charging device identification information and the charging device security key acquired from the storage device 127, to the server device 104.

It should be noted that, here, the power storage device identification information and the power storage device security key are transmitted from the power storage device 101 to the charging device 102. The power storage device identification information, the power storage device security key, the charging device identification information, and the charging device security key are then transmitted from the charging device 102 to the server device 104.

However, the charging device identification information and the charging device security key may be transmitted from the charging device 102 to the power storage device 101. The power storage device identification information, the power storage device security key, the charging device identification information, and the charging device security key may then be transmitted from the power storage device 101 to the server device 104.

Next, the server device 104 receives the power storage device identification information, the power storage device security key, the charging device identification information, and the charging device security key (S703). The server device 104 then determines the possibility of reading the power storage device identification information and the charging device identification information on the basis of the power storage device security key and the charging device security key (S704).

Specifically, the server device 104 determines that it is possible to read the power storage device identification information if the power storage device security key corresponds with predetermined information, and that it is not possible to read the power storage device identification information if the power storage device security key does not correspond with the predetermined information. Similarly, the server device 104 determines that it is possible to read the charging device identification information if the charging device security key corresponds with predetermined information, and that it is not possible to read the charging device identification information if the charging device security key does not correspond with the predetermined information.

The predetermined information may be stored in the storage device 144 of the server device 104, for example. Alternatively, the predetermined information may be information that is generated on the basis of a predetermined rule. The power storage device security key may be an authentication key for authenticating the power storage device 101. The charging device security key may be an authentication key for authenticating the charging device 102.

The server device 104, when having determined that it is possible to read both the power storage device identification information and the charging device identification information (yes in S704), reads both the power storage device identification information and the charging device identification information. The server device 104 then determines whether or not the power storage device identification information and the charging device identification information that have been read are registered (S205).

If the power storage device identification information and the charging device identification information that have been read are registered (yes in S205), the server device 104 transmits information indicating that charging is permitted to the charging device 102 (S206). If the power storage device identification information and the charging device identification information that have been read are not registered (no in S205), the server device 104 transmits information indicating that charging is prohibited to the charging device 102 (S207).

The server device 104, when having determined that it is not possible to read at least one of the power storage device identification information and the charging device identification information (no in S704), does not read the power storage device identification information and the charging device identification information, and transmits information indicating that charging is prohibited to the charging device 102 (S207).

As mentioned above, the server device 104 uses the power storage device security key and the charging device security key to thereby be able to increase the credibility of the power storage device identification information and the charging device identification information. The server device 104 is then able to suppress harmful effects where the power storage device 101 is used inappropriately and billing processing is carried out inappropriately due to so-called identity fraud.

It should be noted that, in the example in FIG. 11, similar to the example in FIG. 6, the information indicating that charging is permitted or charging is prohibited may be transmitted to the power storage device 101. Furthermore, the transmission of information indicating that charging is prohibited may be omitted. Furthermore, the example in FIG. 11 may be combined with the example in FIG. 9 or may be combined with the example in FIG. 10.

For example, the server device 104, after having determined that it is possible to read both the power storage device identification information and the charging device identification information (yes in S704), may determine whether or not the power storage device 101 has been stolen (S602). Then, the server device 104, after having determined that the power storage device 101 has not been stolen (no in S602), may determine whether or not the power storage device identification information and the charging device identification information are registered (S205).

As mentioned above, the server device 104 in the present embodiment is provided with the reception device 141, the determination device 142, and the transmission device 143. In addition, the server device 104 may be provided with the storage device 144. The reception device 141 receives the charging device identification information and the power storage device identification information from at least one of the charging device 102 and the power storage device 101. Here, the charging device identification information may be identification information of the charging device 102, and may include individual identification information of the charging device 102. The power storage device identification information may be identification information of the power storage device 101, and may include individual identification information of the power storage device 101.

The determination device 142 determines the possibility of charging the power storage device 101 from the charging device identification information and the power storage device identification information received by the reception device 141. The transmission device 143 transmits information indicating the possibility of charging the power storage device 101 to at least one of the charging device 102 and the power storage device 101.

Thus, the server device 104 is able to use both the power storage device identification information and the charging device identification information to determine the possibility of charging. Compared to the power storage device 101, the possibility of the charging device 102 being taken outside and used is low, and the possibility of the charging device 102 being used by an unauthorized person other than the owner of the charging device 102 is low. Consequently, the server device 104, by using both the power storage device identification information and the charging device identification information, is able to suppress the power storage device 101 being used by an unauthorized person, and is able to support the appropriate use of the power storage device 101.

The determination device 142 may be a control device that associates and stores the power storage device identification information and the charging device identification information in the storage device 144. For example, the power storage device identification information and the charging device identification information are associated and stored in the storage device 144 when the power storage device 101 and the charging device 102 are rented.

The determination device 142 then determines that it is possible to charge the power storage device 101 in the case where the association between the power storage device identification information and the charging device identification information received corresponds with the association between the power storage device identification information and the charging device identification information stored in the storage device 144. Also, the determination device 142 determines that it is not possible to charge the power storage device 101 in the case where the association between the power storage device identification information and the charging device identification information received does not correspond with the association between the power storage device identification information and the charging device identification information stored in the storage device 144.

The server device 104 is thereby able to appropriately determine the possibility of charging the power storage device 101, on the basis of the information stored in the storage device 144.

Furthermore, the transmission device 143 may transmit a query regarding the possibility of charging the power storage device 101 to an external communication terminal 105 in the case where the association between the power storage device identification information and the charging device identification information received does not correspond with the association between the power storage device identification information and the charging device identification information stored in the storage device 144. For example, the communication terminal 105 is at least one of a communication terminal of the owner of the power storage device 101, and a communication terminal of the owner of the charging device 102.

Then, after the query has been transmitted to the communication terminal 105, if the reception device 141 receives response information from the communication terminal 105 indicating that it is not possible to charge the power storage device 101, the determination device 142 may determine that it is not possible to charge the power storage device 101. If the reception device 141 receives response information from the communication terminal 105 indicating that it is possible to charge the power storage device 101, the determination device 142 may determine that it is possible to charge the power storage device 101.

Thus, the server device 104, as appropriate, is able to issue a query regarding the possibility of charging to at least one of the legitimate owner of the power storage device 101 and the legitimate owner of the charging device 102. The server device 104 is then able to appropriately determine the possibility of charging the power storage device 101, on the basis of the information stored in the storage device 144 or the response to the query.

Furthermore, if the reception device 141 receives response information from the communication terminal 105 indicating that it is possible to charge the power storage device 101, the determination device 142 may associate and store the power storage device identification information and the charging device identification information received, in the storage device 144.

Thus, the server device 104 is able to appropriately associate and store the power storage device identification information and the charging device identification information in the storage device 144 on the basis of the response to the query.

Furthermore, the reception device 141 may receive information indicating that the power storage device 101 has been stolen, and stolen power storage device identification information. Here, the stolen power storage device identification information is the identification information of the stolen power storage device 101. When the power storage device identification information constitutes stolen power storage device identification information, the determination device 142 may determine that it is not possible to charge the power storage device 101 regardless of the association between the power storage device identification information and the charging device identification information. The transmission device 143 may then transmit information indicating that it is not possible to charge the power storage device 101 to at least one of the charging device 102 and the power storage device 101.

Thus, the server device 104 is able to suppress use of the stolen power storage device 101. Consequently, the server device 104 is able to suppress the inappropriate use of the power storage device 101, and is able to support the appropriate use of the power storage device 101.

Furthermore, the power storage device identification information may include at least one of the manufacturing information and the design information of the power storage device 101. The credibility of the power storage device identification information is thereby increased. Furthermore, the server device 104 is able to appropriately determine the possibility of charging the power storage device 101 in accordance with the manufacturing information or the design information of the power storage device 101. Consequently, the server device 104 is able to suppress the inappropriate use of the power storage device 101.

Furthermore, the charging device identification information may include at least one of the manufacturing information and the design information of the charging device 102. The credibility of the charging device identification information is thereby increased. Furthermore, the server device 104 is able to appropriately determine the possibility of charging the power storage device 101 in accordance with the manufacturing information or the design information of the charging device 102. Consequently, the server device 104 is able to suppress the inappropriate use of the power storage device 101.

Furthermore, the reception device 141 may receive the power storage device security key and the charging device security key together with the charging device identification information and the power storage device identification information. Here, the power storage device security key is a security key for the power storage device 101. Furthermore, the charging device security key is a security key for the charging device 102.

The determination device 142 may then decide the possibility of reading the power storage device identification information and the charging device identification information on the basis of the power storage device security key and the charging device security key received. Also, the determination device 142, if having decided that it is possible to read the power storage device identification information and the charging device identification information, may read the power storage device identification information and the charging device identification information, and determine the possibility of charging the power storage device 101 from the power storage device identification information and the charging device identification information that have been read.

The credibility of the power storage device identification information and the charging device identification information is thereby increased. Consequently, inappropriate use of the power storage device 101 is suppressed.

Furthermore, in the abovementioned description, the information indicating the possibility of charging is information indicating that charging is possible or charging is not possible. Consequently, the information indicating the possibility of charging may be information indicating that charging is possible or may be information indicating that charging is not possible. Furthermore, the possibility of charging may mean permission for charging. That is, charging being possible may mean that charging is permitted, and charging not being possible may mean that charging is prohibited.

Furthermore, the storage device 144 may not be used to determine the possibility of charging. For example, the server device 104, as appropriate, may transmit a query to the communication terminal 105 and determine the possibility of charging on the basis of a response received from the communication terminal 105. Alternatively, the server device 104 may determine the possibility of charging on the basis of whether or not the power storage device identification information and the charging device identification information conform with a predetermined standard.

As mentioned above, the appropriate use of a power storage device is supported by a server device and the like in the present disclosure.

It should be noted that, in the abovementioned embodiments, the constituent elements may be configured by using dedicated hardware, or may be realized by executing a software program suitable for the constituent elements. The constituent elements may be realized by a program execution unit such as a CPU or a processor reading out and executing a software program recorded in a recording medium such as a hard disk or a semiconductor memory. Here, software that realizes the server device and the like of the abovementioned embodiment is a program such as the following.

In other words, this program causes a computer to execute a method for controlling a server device that includes: (a) receiving identification information of a charging device including individual identification information of the charging device, and identification information of a power storage device, which is connected to the charging device, including individual identification information of the power storage device, from at least one of the charging device and the power storage device; (b) determining the possibility of charging the power storage device from the identification information of the power storage device and the identification information of the charging device received in (a); and (c) transmitting information indicating the determined possibility of charging the power storage device to at least one of the charging device and the power storage device.

Furthermore, in the abovementioned embodiments, the constituent elements may be circuits. The plurality of constituent elements may constitute one circuit in their entirety or may constitute separate circuits. Furthermore, the circuits may be general-purpose circuits or may be dedicated circuits.

A server device according to one or more aspects has been described heretofore on the basis of the embodiments; however, the present disclosure is not restricted to these embodiments. Modes in which various modifications conceived by a person skilled in the art have been implemented in the present embodiments, and modes constructed by combining the constituent elements in different embodiments may also be included within the scope of one or more aspects provided they do not depart from the purpose of the present disclosure.

For example, in the abovementioned embodiments, processing executed by a specific constituent element may be executed by another constituent element instead of the specific constituent element. Furthermore, the order of the plurality of processing may be altered, and the plurality of processing may be executed in parallel.

The present disclosure is able to be used for a server device and the like that determine the possibility of charging a power storage device, and is able to be applied to a power storage device charging system, a power storage device rental system, a power storage device management system, a billing system, and the like.

What is claimed is:
1. A method comprising:
receiving, by a receiver, from at least one of a charging device and a power storage device and in a connection of the charging device and the power storage device, identification information of the charging device including individual identification information of the charging device, and identification information of the power storage device including individual identification information of the power storage device, the power storage device being connected to the charging device;
determining, by a processor, a possibility of charging the power storage device based on whether or not an association between the received identification information of the power storage device and the received identification information of the charging device in the connection of the charging device and the power storage device is appropriate; and transmitting, by a transmitter, information indicating the determined possibility of charging the power storage device to at least one of the charging device and the power storage device.

2. The method according to claim 1, further comprising:

generating, by the processor, an association between the received identification information of the power storage device and the received identification information of the charging device, wherein, in the determining of the possibility of charging, when the generated association between the received identification information of the power storage device and the received identification information of the charging device corresponds with an association between identification information of the power storage device and identification information of the charging device stored in a storage device of a server device, charging of the power storage device is determined as being possible, and when the generated association between the received identification information of the power storage device and the received identification information of the charging device does not correspond with the association between the identification information of the power storage device and the identification information of the charging device stored in the storage device, charging of the power storage device is determined as not being possible.

3. The method according to claim 1, further comprising:

generating, by the processor, an association between the identification information of the power storage device and the identification information of the charging device, wherein, in the determining of the possibility of charging, when the generated association between the received identification information of the power storage device and the received identification information of the charging device corresponds with an association between identification information of the power storage device and identification information of the charging device stored in a storage device of a server device, charging of the power storage device is determined as being possible, and when the generated association between the received identification information of the power storage device and the received identification information of the charging device received does not correspond with the association between the identification information of the power storage device and the identification information of the charging device stored in the storage device, a query regarding the possibility of charging of the power storage device is transmitted to an external communication terminal, and, after the query has been transmitted to the external communication terminal, when response information indicating that charging of the power storage device is not possible is received from the external communication terminal, charging the power storage device is determined as not being possible, and when response information indicating that charging of the power storage device is possible is received from the external communication terminal, charging the power storage device is determined as being possible.

4. The method according to claim 3, further comprising:

when the response information indicating that charging of the power storage device is possible is received from the external communication terminal, storing, in the storage device, generated association between the received identification information of the power storage device and the received identification information of the charging device.

5. The method according to claim 1, further comprising:

receiving, by the receiver, information indicating that the power storage device has been stolen, and identification information of the stolen power storage device; and when the received identification information of the power storage device matches with the identification information of the stolen power storage device, regardless of correspondence between the received identification information of the power storage device and the received identification information of the charging device, determining that charging of the power storage device is not possible, and transmitting, by the transmitter, information indicating that charging of the power storage device is not possible to at least one of the charging device and the power storage device.

6. The method according to claim 1, wherein the identification information of the power storage device further includes at least one of manufacturing information of the power storage device and design information of the power storage device.

7. The method according to claim 1, wherein the identification information of the charging device further includes at least one of manufacturing information of the charging device and design information of the charging device.

8. The method according to claim 1, wherein, in the receiving of the identification information of the charging device and the identification information of the power storage device, a security key of the power storage device and a security key of the charging device are received together with the identification information of the charging device and the identification information of the power storage device, and wherein the method further comprises:

determining, by the processor, a possibility of reading the identification information of the power storage device and the identification information of the charging device, based on the received security key of the power storage device and the received security key of the charging device, and, wherein, in the determining of the possibility of charging, when reading the identification information of the power storage device and the identification information of the charging device is determined as being possible, the identification information of the power storage device and the identification information of the charging device are read, and the possibility of charging of the power storage device is determined based on the identification information of the power storage device and the identification information of the charging device that have been read.

9. The method according to claim 1, wherein the identification information of the charging device and the identification information of the power storage device are received from the power storage device that is unmounted on an electrical device.

10. The method according to claim 1, wherein the identification information of the power storage device is transmitted from the power storage device to the charging device, and thereafter the identification information of the power storage device is received from the charging device.

11. The method according to claim 1, wherein the charging device is portable.

12. The method according to claim 1, wherein the power storage device is a removable battery storage pack compatible with an electrical device.

13. A management system, comprising:
a receiver that receives, from at least one of a charging device and a power storage device, and in a connection of the charging device and the power storage device, identification information of the charging device including individual identification information of the charging device, and identification information of the power storage device including individual identification information of the power storage device, the power storage device being connected to the charging device;
a processor that determines a possibility of charging the power storage device based on whether or not an association between the received identification information of the power storage device and the received identification information of the charging device in the connection of the charging device and the power storage device is appropriate; and
a transmitter that transmits information indicating the possibility of charging the power storage device determined by the processor, to at least one of the charging device and the power storage device.

\* \* \* \* \*